US010867500B2

(12) United States Patent
Xin et al.

(10) Patent No.: US 10,867,500 B2
(45) Date of Patent: Dec. 15, 2020

(54) GAS MONITORING DEVICE, GAS MONITORING SYSTEM, GAS MONITORING METHOD, CABINET AND COMPUTER READABLE STORAGE MEDIUM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Qin Xin, Beijing (CN); Tingting Zhao, Beijing (CN); Lulu Li, Beijing (CN); Meiling Jin, Beijing (CN); Cai Zheng, Beijing (CN); Liangliang Li, Beijing (CN); Yingxue Yu, Beijing (CN); Yahui Niu, Beijing (CN); Yujie Liu, Beijing (CN); Zhiqiang Zhang, Beijing (CN); Jian Zhang, Beijing (CN); Jinzhao Zhou, Beijing (CN); Jiao Chang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/564,300

(22) Filed: Sep. 9, 2019

(65) Prior Publication Data
US 2020/0273310 A1 Aug. 27, 2020

(30) Foreign Application Priority Data
Feb. 25, 2019 (CN) .......................... 2019 1 0143692

(51) Int. Cl.
*G01N 21/59* (2006.01)
*G08B 17/103* (2006.01)
(52) U.S. Cl.
CPC ........... *G08B 17/103* (2013.01); *G01N 21/59* (2013.01)
(58) Field of Classification Search
CPC ........... G01N 21/1702; G01N 21/3504; G01N 21/65; G01N 29/2418; G01N 15/14;
(Continued)

(56) References Cited

U.S. PATENT DOCUMENTS 4,945,230 A * 7/1990 Saaski .................... G01D 5/268
250/226
7,940,400 B2 * 5/2011 Lopushansky ..... G01D 5/35303
356/519

(Continued)

*Primary Examiner* — Michael P Stafira
(74) *Attorney, Agent, or Firm* — Westman, Champlin & Koehler, P.A.

(57) ABSTRACT

The present disclosure provide a gas monitoring device, a gas monitoring system, a gas monitoring method, a cabinet, and a computer readable storage medium. The gas monitoring device includes: a tubular housing, a light transmission module arranged at one end of the tubular housing, and a gas detecting module arranged at the other end of the tubular housing, in which a first end surface of the light transmission module, a second end surface of the gas detecting module and the tubular housing form a cavity, and the first end surface and the second end surface are parallel to each other; the light transmission module is configured to input incident light to the cavity, and the gas detecting module is configured to adjust a distance between the second end surface and the first end surface according to a concentration of the gas to be detected.

20 Claims, 5 Drawing Sheets

(58) Field of Classification Search
CPC ........... G01N 15/1434; G01N 15/1436; G01N 15/147; G01N 15/1484; G01N 2015/0065; G01N 2015/149; G01N 2015/1497; G01N 2201/0612; G01N 15/1427; G01N 15/1429; G01N 15/1459; G01N 15/1463; G01N 2015/1006; G01N 2015/1493; G01N 2021/653; G01N 21/35; G01N 21/3563; G01N 21/7746; G01N 21/39; G01N 21/552; G01N 21/00; G01N 2021/1704; G01N 2021/3595; G01N 2021/399; G01N 21/45; G01N 2021/391; G01N 21/031; G01N 2201/06113; G01N 21/658; G01N 21/7703; G01N 30/74; G01N 2021/3513; G01N 2021/434; G01N 2021/451; G01N 2021/4761; G01N 2021/7723; G01N 2021/7786; G01N 2030/025; G01N 21/0332; G01N 21/274; G01N 21/31; G01N 21/33; G01N 21/3581; G01N 21/4795; G01N 21/636; G01N 21/7743; G01N 2291/0427; G01N 29/2425; G01N 30/02; G01N 30/48; G01N 30/6034; G01N 30/6082; G01N 33/0027; G01N 33/0037; G01N 17/008; G01N 1/2205; G01N 1/2226; G01N 2001/2267; G01N 2015/1454; G01N 2021/0106; G01N 2021/0378; G01N 2021/054; G01N 2021/1708; G01N 2021/3133; G01N 2021/3148; G01N 2021/396; G01N 2021/397; G01N 2021/6421; G01N 2021/6432; G01N 2021/651; G01N 2021/7709; G01N 2021/772; G01N 2021/773; G01N 2021/7763; G01N 2021/7776; G01N 2021/7779; G01N 2021/8405; G01N 21/05; G01N 21/11; G01N 21/17; G01N 21/27; G01N 21/29; G01N 21/3577; G01N 21/3586; G01N 21/4133; G01N 21/43; G01N 21/431; G01N 21/532; G01N 21/55; G01N 21/553; G01N 21/554; G01N 21/59; G01N 21/6428; G01N 21/643; G01N 21/6458; G01N 2201/0221; G01N 2201/0696; G01N 2201/08; G01N 2201/088; G01N 2201/12; G01N 2201/129; G01N 2291/014; G01N 2291/021; G01N 2291/2695; G01N 2333/01; G01N 29/12; G01N 30/466; G01N 30/468; G01N 30/6095; G01N 30/72; G01N 33/2841; G01N 33/487; G01N 33/497; G01N 33/54366; G01N 33/54373; G01N 2030/121; G01N 2030/3076; G01N 2021/1795; G01N 2021/3531; G01N 2030/3015; G01N 21/3518; G01N 33/0036; G01N 2030/642; G01N 21/359; G01N 2201/101; G01N 27/125; G01N 27/128; G01N 33/225; G01N 1/24; G01N 2001/021; G01N 2030/123; G01N 2030/3061; G01N 2030/8881; G01N 2035/00881; G01N 21/314; G01N 21/3151; G01N 2201/0616; G01N 25/18; G01N 30/08; G01N 30/12; G01N 30/30; G01N 30/461; G01N 30/66; G01N 33/0047; G01N 35/00871; G01N 30/46; G01N 30/463; G01N 30/465; G01J 3/26; G01J 3/42; G01J 3/10; G01J 3/0208; G01J 3/45; G01J 3/021; G01J 3/0218; G01J 3/0224; G01J 3/0229; G01J 3/28; G01J 5/08; G01J 1/0425; G01J 1/06; G01J 2003/102; G01J 2003/1828; G01J 2003/2806; G01J 2003/2826; G01J 3/02; G01J 3/0205; G01J 3/027; G01J 3/0291; G01J 3/108; G01J 3/18; G01J 3/1895; G01J 3/2803; G01J 3/4338; G01J 5/04; G01J 5/046; G01J 5/0809; G01J 5/58; G01J 2005/583; G01J 3/0202; G01J 3/0243; G01J 3/0256; G01J 3/0286; G01J 5/0014; G01J 5/0018; G01J 5/0088; G01J 5/042; G01J 5/0812; G01J 5/0821; G01J 5/0825; G01J 5/0831; G01J 5/0875; G01J 5/0887; G01J 5/0896; G01J 5/20; G01J 5/22; G01J 5/601; G01J 3/06; G01J 3/2823; G01J 3/0297; G01J 3/44; G01J 3/4412; G01J 2003/1213; G01J 2003/1221; G01J 1/0233; G01J 1/0271; G01J 5/0265; G08B 25/001; G08B 25/003; G08B 21/16; G08B 25/10; G08B 17/06; G08B 17/10; G08B 29/04; G08B 21/12; G08B 21/18; G08B 25/14; G08B 5/36; G02B 6/124; G02B 2006/12061; G02B 2006/12078; G02B 2006/12123; G02B 2006/12138; G02B 26/001; G02B 6/12004; G02B 5/1885; G02B 5/28; G02B 6/32; G02B 6/4239; G02B 6/424; G02B 21/02; G02B 26/0833; G02B 6/021; G02B 6/02328; G02B 2290/25; G02B 11/18; G02B 1/00; G02B 9/02004; G02B 9/02023; G02B 9/02028; G02B 9/02056; G02B 9/02072; G02B 9/0209; G02B 9/02051; G02B 2006/0325; G02B 2006/12102; G02B 6/02361; G02B 6/12; G02B 6/26; G02B 6/3801; G02B 6/3822; G02B 6/3833; G01B 2290/25; G01B 11/18; G01B 1/00; G01B 9/02004; G01B 9/02023; G01B 9/02028; G01B 9/02056; G01B 9/02072; G01B 9/0209; G01B 9/02051

See application file for complete search history.

(56) References Cited

U.S. PATENT DOCUMENTS

| | | | |
|---|---|---|---|
| 2006/0289724 A1* | 12/2006 | Skinner | G01D 5/268 250/221 |
| 2008/0297808 A1* | 12/2008 | Riza | G01B 9/02072 356/503 |
| 2013/0215429 A1* | 8/2013 | Song | G01J 3/45 356/454 |
| 2015/0253297 A1* | 9/2015 | Ning | G01J 3/26 250/338.3 |
| 2015/0377765 A1* | 12/2015 | Chilukuri | G01B 11/0675 356/73.1 |
| 2018/0052049 A1* | 2/2018 | Varpula | G01J 3/26 |
| 2018/0120266 A1* | 5/2018 | Tumpold | G01N 29/2418 |
| 2018/0164215 A1* | 6/2018 | Glacer | G01N 21/1702 |
| 2018/0321103 A1* | 11/2018 | Johansen | G01L 9/0076 |
| 2020/0141805 A1* | 5/2020 | Duraffourg | G01J 3/42 |

* cited by examiner

GAS MONITORING DEVICE, GAS MONITORING SYSTEM, GAS MONITORING METHOD, CABINET AND COMPUTER READABLE STORAGE MEDIUM

CROSS-REFERENCE TO RELATED APPLICATION

This application claims a priority to Chinese Patent Application No. 201910143692.8 filed on Feb. 25, 2019, the disclosures of which are incorporated in their entirety by reference herein.

TECHNICAL FIELD

The present disclosure relates to, but is not limited to, the field of sensor technology, in particular to a gas monitoring device, a gas monitoring system and a gas monitoring method, a cabinet, and a computer readable storage medium.

BACKGROUND

At present, most kitchens use gas tanks or natural gas as a gas supply manner, and the safety of kitchen gas has become an issue of great concern to users in daily life.

In daily life, the leakage of kitchen gas has occurred from time to time, posing a certain threat to the users' life. When the gas leaks to a certain concentration, it will cause an explosion when it encounters a naked fire. The devices for detecting gas leakage in the prior art are, for example, a contact combustion type gas sensor, an evanescent field type optical fiber sensor, a refractive index change type optical fiber sensor, a dye indicating type optical fiber sensor, and a spectral absorption type optical fiber sensor, etc. The above-mentioned sensors for cabinet security detection generally have the following problems: first, sensitivity and precision are low; second, practicality is poor, for example, some components are easily stained, affected by the surrounding environment, have poor stability, complicated structures and high cost, and other issues.

SUMMARY

Embodiments of the present disclosure provide a gas monitoring device, a gas monitoring system, a gas monitoring method, a cabinet, and a computer readable storage medium.

An embodiment of the present disclosure provides a gas monitoring device, which includes a tubular housing, a light transmission module arranged at one end of the tubular housing, and a gas detecting module arranged at the other end of the tubular housing, in which a first end surface of the light transmission module proximate to the gas detecting module, a second end surface of the gas detecting module proximate to the first end surface, and the tubular housing form a cavity, and the first end surface and the second end surface are parallel to each other; the light transmission module is configured to input incident light to the cavity through the first end surface; and the gas detecting module is configured to adjust a distance between the second end surface and the first end surface according to a concentration of a gas to be detected.

In one example, in the gas monitoring device as described above, the gas detecting module includes: a gas-sensitive film layer arranged on one side of the tubular housing away from the light transmission module and a reflective film arranged to be attached in the tubular housing for forming the second end surface, and the gas-sensitive film layer, the reflective film and the tubular housing form a hollow structure, the hollow structure is filled with a compressed gas; the gas-sensitive film layer is configured to adsorb the gas to be detected; and the reflective film is configured to move the second end surface toward the first end surface according to a mass of the gas adsorbed by the gas-sensitive film layer.

In one example, in the gas monitoring device as described above, the light transmission module includes a sensing optical fiber arranged to be attached on an inner wall of the tubular housing, and the sensing optical fiber includes a fiber core and an optical fiber tube for wrapping the fiber core; and the sensing optical fiber is configured to input incident light entering the fiber core into the cavity.

In one example, in the gas monitoring device as described above, a material of the gas-sensitive film layer includes one or more of a composite polymer gas-sensitive material and a conjugated polymer gas-sensitive material.

In one example, in the gas monitoring device as described above, the composite polymer gas-sensitive material includes one or more of polyimide, polyethylene, polytetrafluoroethylene, and polyester; and metal particles, tetrathiafulvalene7,7,8,8-tetracyanoquinodimethane salt or carbon nanotube is used as a conductive filler.

In one example, in the gas monitoring device as described above, the conjugated polymer gas-sensitive material may include one or more of poly(bistributyl-phosphine)-platinum-diethynylbiphenyl, poly-2,5-dibutoxyethynylbenzene and poly-2,5-dioctyloxyethynylbenzene.

In one example, in the gas monitoring device as described above, the material of the reflective film includes titanium oxide or silicon oxide.

In one example, in the gas monitoring device as described above, the gas detecting module is further configured to move the second end surface toward a position proximate to the first end surface when it is detected that the concentration of the gas to be detected increases, and further configured to move the second end surface toward a position away from the first end surface when it is detected that the concentration of the detection gas to be detected decreases.

In one example, in the gas monitoring device as described above, the sensitivity of the gas monitoring device is in direct proportion to a wavelength of incident light reaching on the first end surface.

An embodiment of the present disclosure further provides a gas monitoring system, which includes: a light source device, the gas monitoring device according to any one of the above, a receiving device and a processing device; among them, the light source device is connected to the light transmission module of the gas monitoring device, and configured to input incident light to the cavity through the light transmission module; the receiving device is connected to the light transmission module of the gas monitoring device, and configured to receive a first light beam and a second light beam emitted by the incident light after passing through the cavity, and transmit a received optical signal to the processing device; and the processing device is connected to the receiving device, and configured to determine whether the concentration of the gas to be detected is greater than a safety threshold according to a phase difference between the first light beam and the second light beam.

In one example, the gas monitoring system as described above further includes: an isolation device connected between the light source device and the gas monitoring device and configured to individually propagate incident light emitted from the light source device to the gas monitoring device.

In one example, the gas monitoring system as described above further includes: a beam splitting device connecting the light source device and the receiving device in parallel to the gas monitoring device, and configured to perform a beam splitting treatment to the incident light input by the light source device to the gas monitoring device and the light emitted after passing through the gas monitoring device.

In one example, the gas monitoring system as described above further includes: a warning device connected to the processing device, and configured to send out an alarm signal when the processing device determines that the concentration of the gas to be detected is greater than the safety threshold.

In one example, in the gas monitoring system as described above, the incident light input by the light source device through the light transmission module to the cavity has a wavelength ranging from 1300 nm to 1680 nm.

An embodiment of the present disclosure further provides a gas monitoring method, performed by the gas monitoring system according to any one of the above, in which the method includes: turning on the light source device to input incident light to the gas monitoring device; receiving the first light beam and the second light beam emitted by the incident light after passing through the gas monitoring device; and determining whether the concentration of the gas to be detected is greater than the safety threshold according to the phase difference between the first light beam and the second light beam.

In one example, the gas monitoring method as described above further includes: testing with a standard substance in advance to determine a critical value of a variation in the phase difference between the first light beam and the second light beam when the concentration of the gas to be detected reaches the safety threshold; wherein determining whether the concentration of the gas to be detected is greater than the safety threshold according to the phase difference between the first light beam and the second light beam includes: determining that the concentration of the gas to be detected reaches the safety threshold when the variation in the phase difference between the first light beam and the second light beam reaches the critical value.

In one example, the gas monitoring method as described above further includes: sending out an alarm signal when it is determined that the concentration of the gas to be detected is greater than the safety threshold.

An embodiment of the present disclosure further provides a cabinet provided with the gas monitoring system according to any one of the above.

An embodiment of the present disclosure further provides computer readable storage medium which stores executable instructions capable of implementing the gas monitoring method according to any one of the above when executed by a processor.

BRIEF DESCRIPTION OF THE DRAWINGS

The drawings described herein are intended to provide a further understanding of the technical solutions of the present disclosure, and constitute a part of this disclosure. They together with the embodiments of the present disclosure are intended to illustrate the technical solutions of the present disclosure, and do not constitute a limitation of the technical solutions of the present disclosure.

DETAILED DESCRIPTION

Figure 1:
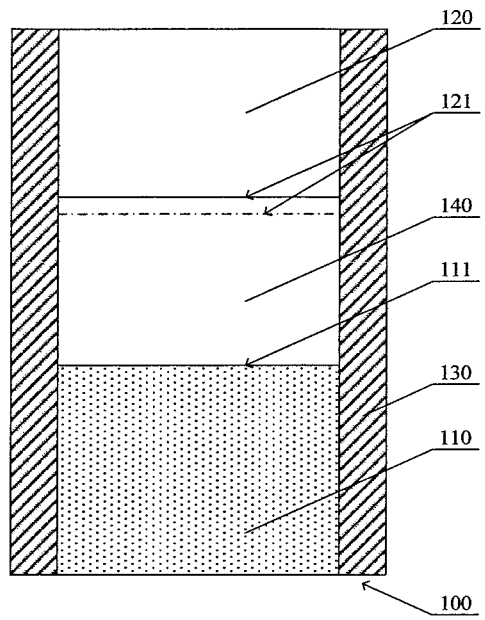
FIG. 1 is a schematic view showing the structure of a gas monitoring device according to an embodiment of the present disclosure.

In order to illustrate the purposes, technical solutions and advantages of the present disclosure in a clearer manner, the embodiments of the present disclosure will be described in detail hereinafter in conjunction with the drawings. It should be noted that the embodiments in the disclosure and the features in the embodiments can be arbitrarily combined with each other, as long as they do not contradict each other.

Nowadays, with the improvement of people's living standards, the pace of life is getting faster and faster, and it becomes common that the house is unoccupied during the day time, or the elderly, children or pets are alone at home. However, the leakage of kitchen gas has occurred from time to time, posing a certain threat to the users' life. When the gas leaks to a certain concentration, it will cause an explosion when it encounters a naked fire. The following is a brief description of several sensors that detect gas leakage in the prior art.

First, contact combustion type gas sensor: the sensor is limited to the detection of flammable gas, can only distinguish between flammable gas and non-flammable gas, but cannot specifically determine the kind of the flammable gas and the concentration of the gas.

Second, evanescent field type fiber sensor: the sensor detects the concentration of the gas only by detecting the degree of absorption of the evanescent field on the surface of the optical fiber by the gas, but due to the practice of this bare optical fiber the optical fiber is easily contaminated, and is of little significance in terms of practicality.

Third, the refractive index change type optical fiber sensor: the sensor is applied with a gas sensitive material to the surface of the optical fiber, which will cause changes in the waveguide effective refractive index, birefringence and loss of the optical fiber, and then the concentration of the gas to be detected is obtained by measuring the change in the light intensity output by the Mach Zede interferometer, however, the detection mode is greatly affected by the ambient temperature and humidity, and the stability is poor.

Fourth, dye indicating type optical fiber sensor: the principle of the sensor is that when the gas chemically reacts with the dye, the optical property of the dye changes, and the concentration of the gas to be detected can be known by measuring the change of the optical property, however, it is limited by the speed of chemical reaction, and the detection system is also complicated.

Fifth, spectral absorption type optical fiber sensor: the theoretical basis of this sensor is the Beer-Lambert law, that is, the gas absorbs the near-infrared light in the transmission window of the quartz optical fiber, the intensity of light output from the optical fiber is attenuated, and the concentration of the gas to be detected can be obtained by detecting the attenuation of the intensity of light, however, this detection mode is relatively expensive.

As can be seen, several sensors for detecting gas leakage in the above prior art generally have problems of relatively low sensitivity and precision, and poor practicability, for example, some components are easily stained, affected by the surrounding environment, have poor stability, complicated structures and high cost, and other issues.

Embodiments of the present disclosure provide a gas monitoring device, a gas monitoring system, a gas monitoring method, a cabinet, and a computer readable storage medium, to solve the pervasive problems of relatively low sensitivity and precision and relatively poor practicality in sensors for security detecting gases in the prior art. The gas monitoring device includes a tubular housing, a light transmission module arranged at one end of the tubular housing, and a gas detecting module arranged at the other end of the tubular housing, in which a first end surface of the light transmission module proximate to the gas detecting module, a second end surface of the gas detecting module, and the tubular housing form a cavity, and the first end surface and the second end surface are parallel to each other; the light transmission module of the gas monitoring device can input incident light to the cavity through the first end surface thereof; and when the distance between the second end surface and the first end surface is fixed, the incident light reaching the first end surface will be emitted as the first light beam and the second light beam having the same emergence angle and a fixed phase difference. The gas detecting module can adjust the distance between the second end surface and the first end surface according to the concentration of the gas to be detected. The gas monitoring device provided by the present disclosure, based on the action principle of the cavity between the light transmission module and the gas detecting module to the light, can change the phase difference between the first light beam and the second light beam in the emitted light by the gas detecting module adjusting the distance between the second end surface and the first end surface of the cavity. Thus, when the concentration of the gas to be detected reaches a critical point, the distance between the second end surface and the first end surface of the cavity changes accordingly, and the deformation amount of the cavity reaches a critical value, so that the phase difference between the first light beam and the second light beam reaches the critical value, thereby achieving an accurate monitoring the concentration of the gas to be detected. In addition, the gas monitoring device has a simple structure, is convenient to use and of low cost, and is very suitable for market-oriented applications.

The present disclosure provides the following specific embodiments, which can be combined with each other, and the same or similar concepts or processes in some embodiments are not described repeatedly sometimes.

FIG. 1 is a schematic view showing the structure of a gas monitoring device according to an embodiment of the present disclosure. The gas monitoring device 100 provided in this embodiment may include a tubular housing 130, a light transmission module 110 arranged at one end of the tubular housing 130, and a gas detecting module 120 arranged at the other end of the tubular housing 130, as shown in FIG. 1, a first end surface 111 of the light transmission module 110 proximate to the gas detecting module 120, a second end surface 121 of the gas detecting module 120 proximate to the first end surface 111, and the tubular housing 130 form a cavity 140, and the first end surface 111 and the second end surface 121 are parallel to each other.

In the above structure of the embodiment of the present disclosure, the light transmission module 110 is configured to input incident light to the cavity 140 through the first end surface 111 thereof.

The cavity 140 may be a Fabry-Perot (F-P) cavity 140. The optical principle of the F-P cavity 140 is that when the distance between the second end surface 121 and the first end surface 111 is fixed, that is, the first end surface 111 and the second end surface 121 are parallel to each other, the incident light reaching the first end surface 111 will be emitted as a first light beam and a second light beam having the same emergence angle and a fixed phase difference, in which the first light beam is the light beam directly reflected by the first end surface 111, and the second light beam is the light beam transmitted through the first end surface 111 to the second end surface 121, reflected by the second end surface 121 and then emitted from the first end surface 111; and the gas detecting module 120 is configured to adjust the distance between the second end surface 121 and the first end surface 111 according to the concentration of the gas to be detected; and FIG. 1 schematically shows two different positions of the second end surface 121.

The gas monitoring device 100 provided by the embodiment of the present disclosure is a sensing device for realizing gas concentration detection. In the gas monitoring device 100, the light transmission module 110 can be connected to an external light source, the incident light passes through the light transmission module 110 and is transmitted to the light incident surface of the cavity 140, and the first end surface 111 of the light transmission module 110 act as its own light emitting surface and the light incident surface of the cavity 140.

In the embodiment of the present disclosure, in the overall structure of the gas monitoring device 100, the tubular housing 130 is the outermost package component. The tubular housing 130 may be a ceramic tube, in which one end of the tubular housing 130 is arranged with the light transmission module 110, the other end is arranged with the gas detecting module 120, and there is a certain distance between the light transmission module 110 and the gas detecting module 120, so that the first end surface 111 and the second end surface 121 proximate to each other in the two oppositely arranged modules and a section of housing part of the tubular housing 130 between the first end surface 111 and the second end surface 121 form a sealing structure, the cavity formed thereby is the cavity 140. The cavity 140 is an F-P cavity 140 having upper and lower reflective end surfaces. Based on the action principle of the F-P cavity 140 on the light, the gas monitoring device 100 in the embodiment of the present disclosure can be regarded as an F-P interference type optical fiber sensor.

In order to facilitate the description of the effect of the F-P cavity 140 on the light in the embodiment of the present disclosure and the role played by the F-P cavity 140 in the embodiment of the present disclosure, the optical path principle of the F-P cavity 140 will be described below with reference to FIG. 2, which is a schematic view showing an optical path principle of an F-P cavity. The F-P cavity 140 in FIG. 2 can be regarded as a single optical fiber, and the F-P cavity 140 has two reflective end surfaces, i.e., a first end surface 111 and a second end surface 121, and the distance L between the two end surfaces is the cavity length of the F-P cavity 140. When incident light is incident on the F-P cavity 140 through the light transmission module 110, the incident light first reaches the first end surface 111 of the F-P cavity 140. A portion of the incident light is directly reflected by the first end surface 111 to form the first light beam a. Another portion of the incident light reaches the second end surface 121 through the first end surface 111, and then is reflected by the second end surface 121 and arrives at the first end surface 111, and is transmitted from the first end surface 111 to form the second light beam b. The first light beam a and the second light beam b formed by the incident light passing through the F-P cavity 140 are light beams having the same emergence angle and a fixed phase difference. As can be seen, the first light beam a and the second light beam b are parallel, and the phase difference of the first light beam a and the second light beam b is related to the optical path difference thereof, that is, related to the cavity length L of the F-P cavity 140. The first light beam a and the second light beam b form an interference wave spectrum generated by the reflection of the F-P cavity 140, and the phase difference thereof can be obtained by analyzing the interference wave spectrum.

When the external parameters (for example, force, deformation) act on the F-P cavity 140 in a certain manner to change the cavity length L, the phase difference between the first light beam a and the second light beam b is changed, which is the working principle of the gas monitoring device 100 provided by the embodiment of the present disclosure. As can be seen from FIG. 1, the two reflective end surfaces of the F-P cavity 140 in the gas monitoring device 100 are the first end surface 111 of the light transmission module 110 and the second end surface 121 of the gas detecting module 120, respectively, in which the gas detecting module 120 for forming one reflective end surface in the F-P cavity 140 can adjust the distance between the second end surface 121 and the first end surface 111, which is the cavity length of the F-P cavity 140, according to the concentration of the gas to be detected. When the gas detecting module 120 is affected by a certain change of an external sensitivity value (for example, when the concentration of the gas to be detected increases), a phase shift $\Delta\phi'$ will occur in the interference wave spectrum, and the parameters of the gas to be detected can be derived backwards from $\Delta\phi'$, for example, it can be reflected backwards by $\Delta\phi'$ whether the content or concentration of methane ($CH_4$) in the air exceeds a set safety threshold. Specifically, taking methane in the air as an example for the gas to be detected, testing is performed with a standard substance of methane in advance, to determine the critical value $\Delta\phi'$ of the variation of the phase difference between the first light beam a and the second light beam b when the methane concentration in the air reaches a critical value C (the methane concentration that is harmful to human safety). During the operation of the gas monitoring device, if the concentration of methane in the air changes, the distance between the first end surface 111 and the second end surface 121 of the cavity 140 changes correspondingly, and the cavity is deformed (i.e., the cavity length changes), thereby changing the phase difference between the first light beam a and the second light beam b. When the methane concentration in the air reaches the critical value C, the deformation amount of the cavity 140 (i.e., the variation of the cavity length) reaches $\Delta A'$, so that the phase difference between the first light beam a and the second light beam b reaches $\Delta\phi'$. Thus, the concentration of the gas to be detected can be accurately monitored.

It should be noted that, in the embodiment of the present disclosure, the gas to be detected by the gas detecting module 120 may be $CH_4$, or may be other gases that are flammable, explosive, or harmful to the human body; and the compressed gas in the hollow structure of the gas detecting module 120 may be compressed air, or may also be other compressed gases, e.g., compressed inert gases.

As compared with the sensor for detecting gas in the prior art, the gas monitoring device 100 in the embodiment of the present disclosure, based on the action principle of the F-P cavity 140 formed between the light transmission module 110 and the gas detecting module to the light, can change the phase difference between the first light beam a and the second light beam b in the emitted light by the gas detecting module adjusting the distance between the second end surface 121 and the first end surface 111 of the F-P cavity 140, thereby accurately monitoring the concentration of the gas to be detected, and solving the problem of poor sensitivity and accuracy of the gas monitoring sensor in the prior art; in addition, the gas monitoring device 100 provided by the embodiment of the present disclosure has a simple structure, is convenient to use and of low cost, and is very suitable for market-oriented applications.

Figure 3:
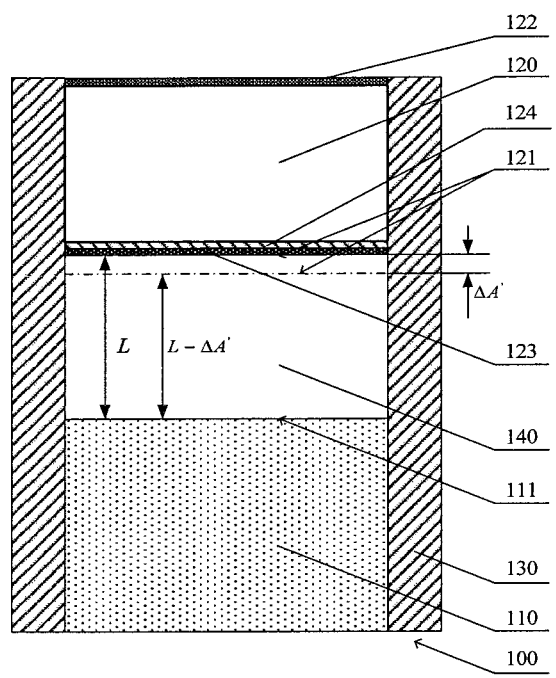
FIG. 3 is a schematic view showing the structure of another gas monitoring device according to an embodiment of the present disclosure.

Optionally, FIG. 3 is a schematic view showing the structure of another gas monitoring device according to an embodiment of the present disclosure. On the basis of the structure of the gas monitoring device 100 shown in FIG. 1, in the embodiment of the present disclosure, the gas detecting module 120 includes: a gas-sensitive film layer 122 arranged to be attached on one side of the tubular housing 130 away from the light transmission module 110, and a reflective film 123 arranged to be attached in the tubular housing for forming the second end surface 121, in which the gas-sensitive film layer 122, the reflective film 123 and the tubular housing 130 form a hollow structure (as shown in FIGS. 1 and 3, the tubular housing 130 for forming the hollow structure is a portion of the housing between the gas-sensitive film layer 122 and the reflective film 123), that is, the gas-sensitive film layer 122, the reflecting film 123, and the tubular housing 130 form a hollow structure filled with a compressed gas.

The structure of the gas detecting module 120 of the embodiment of the present disclosure is as shown in FIG. 3, and the second end surface 121 formed by the reflective film 123 attached in the tubular housing 130 is proximate to the light transmission module 110. The above embodiment has described that the second end surface 121 is one reflective end surface of the cavity 140. In a practical application, for example, a flexible substrate layer for facilitating forming of the reflective film 123 may be arranged to be attached in the tubular housing 130, and then a reflective film 123 is formed on the lower surface of the flexible substrate layer by plasma enhanced chemical vapor deposition (PECVD) technique. The reflective film 123 may be a highly reflective film having high sensitivity, and the material for forming the reflective film 123 may include titanium oxide ($TiO_2$) or silicon oxide ($SiO_2$). The reflective film may have a thickness of 70 nm to 90 nm, for example, about 80 nm. The material of the gas-sensitive film layer 122 may include one or more of a composite polymer gas-sensitive material and a conjugated polymer gas-sensitive material. Among them, the commonly used composite polymer gas-sensitive material may include polyimide, polyethylene, polytetrafluoroethylene, polyester, etc. In practical applications, metal particles, tetrathiafulvalene7,7,8,8-tetracyanoquinodimethane salt (TTF-TCNQ), carbon nanotubes or the like may be used as a conductive filler. The conjugated polymer gas-sensitive material may include: poly-(bistributyl-phosphine)-platinum-diethynylbiphenyl (Pt-DEBP), poly-2,5-dibutoxyethynylbenzene (DOEB), and poly-2,5-dioctyloxyethynylbenzene (DBEB).

In the gas detecting module 120 of the embodiment of the present disclosure, the gas-sensitive film layer 122 is configured to adsorb the gas to be detected; after the gas is absorbed on the upper surface of the hollow structure formed by the gas-sensitive film layer 122, an inherent vibration frequency to the compressed air in the hollow structure is formed based on the mass of the adsorbed gas; and the reflective film 123 is configured to move the second end surface 122 toward the first end surface 111 according to the mass of the gas adsorbed by the gas-sensitive film layer 122.

Based on the above structure of the gas detecting module 120, the sensitivity of the gas monitoring device 100 provided by the embodiment of the present disclosure is analyzed. After the upper surface of the hollow structure formed by the gas-sensitive film layer 122 (i.e., the other end surface opposite to the second end surface 121) is exposed to the air and the mass of the gas-sensitive film layer 122 located on the upper surface increases after adsorbing $CH_4$, thereby compressing the compressed gas in the hollow structure, so that the second end surface 121 formed by the reflective film 123 moves (to the second end surface 121 shown by the dash dot line in FIGS. 1 and 3), for example, as the mass of the gas-sensitive film layer 122 increases, the second end surface 121 moves toward the first end surface 111. The safety gas concentration of the external $CH_4$ is set to be C, and the C is the critical value of the safe concentration. At this time, the $CH_4$ mass absorbed by the gas-sensitive film layer 122 is m, and the natural frequency of the compressed gas at this time is f, which can obtain a good resonance effect. In addition, it is set that when the $CH_4$ mass absorbed by the gas-sensitive film layer 122 gradually increases to m, the amplitude of the compressed gas is A, and the resonance factor is k, and thus the maximum deformation amount $\Delta A'$ of the second end surface 121 formed by the reflective film 123 is:

$$\Delta A' = k*A \quad (1).$$

In the initial state, that is, when the gas-sensitive film layer 122 does not adsorb $CH_4$, the cavity length of the F-P cavity 140 is L, and when the gas monitoring device 100 receives the vibration signal having the amplitude A, the cavity length L' of the F-P cavity 140 is:

$$L' = L - L\Delta A' \quad (2).$$

In case of the F-P reflection, the optical path difference $\Delta L$ between two adjacent light waves is:

$$\Delta L = 2n_2 L \cos\theta \quad (3).$$

where L is the length of the F-P cavity, and $n_2$ is the refractive index of the medium in the F-P cavity 140, and $\theta$ is an angle formed by the light transmitted in the F-P cavity 140 and a normal vector of the optical plane (i.e., the first end surface 111 or the second end surface 121).

Figure 2:
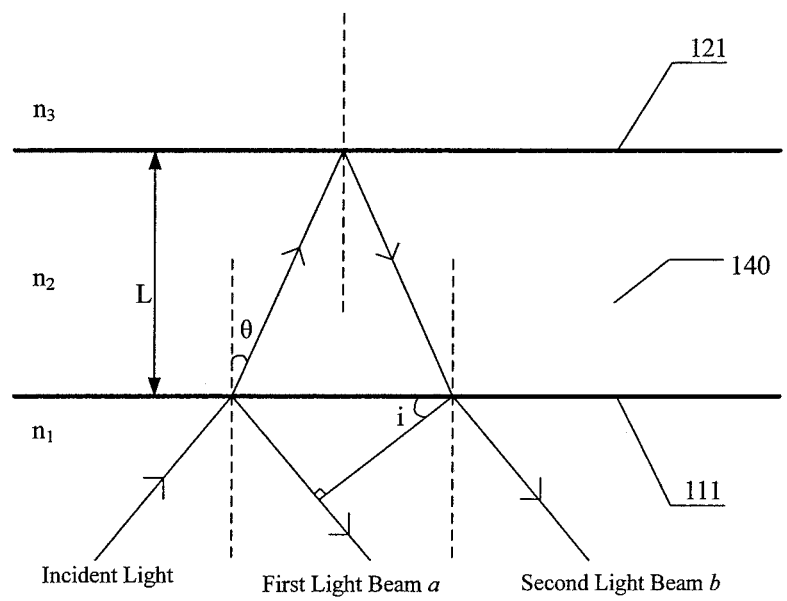
FIG. 2 is a schematic view showing an optical path principle of an F-P cavity.

The principle calculation equation of the phase difference $\Delta\phi$ between the first light beam a and the second light beam b in FIG. 2 is:

$$\Delta\phi = \frac{2\pi}{\lambda} \cdot 2n_2 L \cos\theta. \quad (4)$$

In the above equation (4), $\lambda$ is the wavelength of incident light. Based on the above equation (4), when the reflective film 123 in the gas detecting module 120 is located at the initial position (that is, when the gas-sensitive film layer 122 does not adsorb any $CH_4$), the phase difference of the interference light (i.e., the first light beam a and the second light beam b) is set to be $\Delta\phi_0$. When the gas monitoring device 100 receives the vibration signal having the amplitude A, the second end surface 121 moves toward the first end surface 111 for $\Delta A'$, and the cavity length of the F-P cavity 140 becomes shorter. The phase difference at this time is $\Delta\phi_0 + \Delta\phi'$, and the following equation is:

$$\Delta\phi_0 = \frac{2\pi}{\lambda} \cdot 2n_2 L \cos\theta; \quad (5)$$

$$\Delta\phi_0 + \Delta\phi' = \frac{2\pi}{\lambda} \cdot 2n_2 L' \cos\theta. \quad (6)$$

Equation (6) minus equation (5), and then equation (2) is substituted, to obtain:

$$\Delta\phi' = -\frac{2\pi}{\lambda} 2n_2 \cos\theta \Delta A' = -\frac{2\pi}{\lambda} 2n_2 kA \cos\theta. \quad (7)$$

As can be obtained from the above equation (7), the sensitivity of the gas monitoring device 100 provided by the embodiment of the present disclosure is:

$$\frac{\Delta\phi'}{A} = -\frac{4kn_2\pi}{\lambda} \cos\theta. \quad (8)$$

In the above equation (8), $\Delta\phi'$ is an additional phase difference generated by the first light beam a and the second light beam b emitted through the F-P cavity 140 due to the first end surface 121 moving for k*A (i.e., the additional phase difference generated after the first end surface 111 moves for k*A), in which k is the amplitude factor of the compressed gas in the hollow structure after the second end surface 121 moves for k*A, and A is the amplitude of the compressed gas in the hollow structure after the second end surface 121 moves for k*A. $n_2$ is the refractive index of the medium in the F-P cavity 140, $\lambda$ is the wavelength of the incident light, $\theta$ is the angle formed by the light transmitted in the F-P cavity 140 and the normal vector of the optical plane (i.e., the first end surface 111 or the second end surface 121), and $\pi$ is the circumference ratio.

As can be seen from the above equation (8), the sensitivity of the gas monitoring device 100 is in direct proportion to $\lambda$, and the increase of the wavelength of the incident light can improve the sensitivity of the gas monitoring device 100. Optionally, the embodiment of the present disclosure can use a light beam having a wavelength ranging from 1300 nm to 1680 nm as the incident light; thus, a highly sensitive gas monitoring device can be realized.

Optionally, in the embodiment of the present disclosure, as can be seen from the structure of the gas detecting module 120 and the action principle of the cavity 140 on the light, the gas detecting module 120 in the embodiment of the present disclosure is further configured to move the second end surface 121 toward a position proximate to the first end surface 111 when it is detected that the concentration of the gas to be detected increases, and further configured to move the second end surface 121 toward a position away from the first end surface 111 when it is detected that the concentration of the detection gas to be detected decreases.

Figure 4:
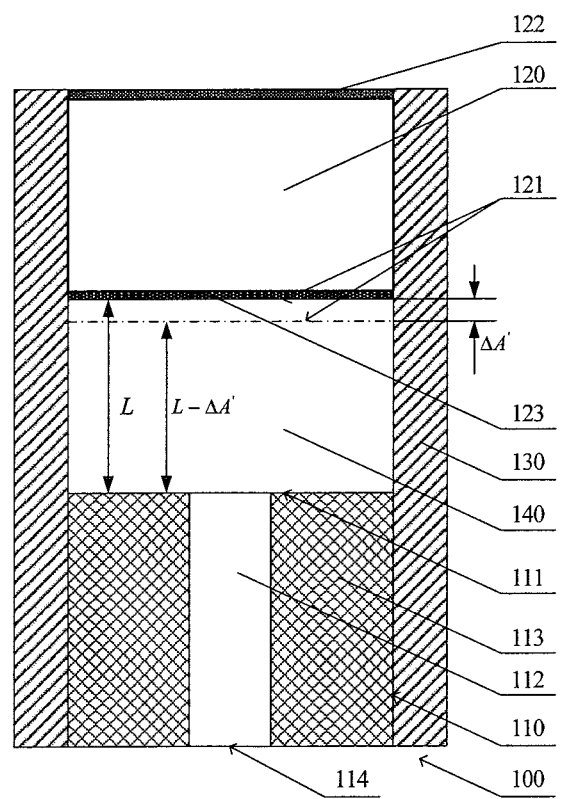
FIG. 4 is a schematic view showing the structure of yet another gas monitoring device according to an embodiment of the present disclosure.

Optionally, FIG. 4 is a schematic view showing the structure of yet another gas monitoring device according to an embodiment of the present disclosure. Based on the structure of the gas monitoring device 100 shown in FIG. 3, in the embodiment of the present disclosure, the light transmission module 110 includes a sensing optical fiber 110 arranged to be attached on an inner wall of the tubular housing 130, in which the sensing optical fiber 110 includes a fiber core 112 and an optical fiber tube 113 for wrapping the fiber core 112.

The sensing optical fiber 110 of the embodiment of the present disclosure may be a single-mode quartz fiber composed of the fiber core 112 and a cladding (i.e., the optical fiber tube 113) for achieving transmission of incident light. The sensing optical fiber 110 is configured to input the incident light entering the fiber core 112 into the cavity 140, and the light is transmitted in the fiber core 112, for example, in a total reflection manner. As can be seen from FIG. 4, the first end surface 111 of the sensing optical fiber 110 is incident surface of the cavity 140, and the first end surface 111 is also the light exiting surface of the sensing optical fiber 110. The incident light is incident into the fiber core 112 from the other end surface 114 of the sensing optical fiber 110 opposite to the first end surface 111, and the incident light is transmitted in the fiber core 112 in a total reflection manner, and thus minimizes the loss of light energy.

The gas monitoring device 100 provided by the above embodiments of the present disclosure is an F-P interference type optical fiber sensor, and the upper surface of the hollow structure formed by the gas-sensitive film layer 122 of the sensor is exposed to the air. Because the polymer gas-sensitive material may undergo micro-deformation due to the change in the concentration of the gas to be measured (for example, $CH_4$) and thus resonates with the compressed gas, such that the second end surface 121 formed by the reflective film 123 moves toward the first end surface 111, thereby also changing the phase of the interference wave spectral. The concentration of $CH_4$ can be inversely calculated from this change, thereby achieving gas detection. In addition, the F-P interference type optical fiber sensor has the advantages of anti-electromagnetic interference, insulation, high sensitivity, small volume, light weight, corrosion resistance and small signal attenuation, and satisfies application scenarios such as inflammable and explosive occasions, occasions that cannot carry static charge, and occasions having strong electromagnetic interference. If the F-P interference type optical fiber sensor is applied to the cabinet, the cost is low, the design is simple, and the marketization is easy. Especially in a room where there is no body or the user is asleep, it can greatly reduce risks of gas poisoning or kitchen explosion when a child or a pet stays alone at home.

Based on the gas monitoring device 100 provided by the above embodiment of the present disclosure, the embodiment of the present disclosure further provides a gas monitoring system, and the main structure of the gas monitoring system includes the gas monitoring device 100 according to any one of the above embodiments of the present disclosure.

Figure 5:
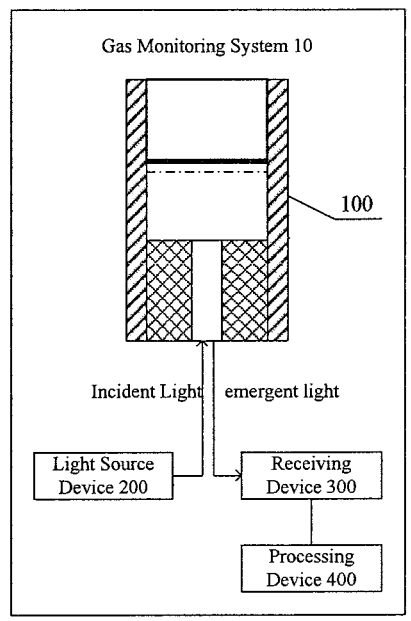
FIG. 5 is a schematic view showing the structure of a gas monitoring system according to an embodiment of the present disclosure.

FIG. 5 is a schematic view showing the structure of a gas monitoring system according to an embodiment of the present disclosure. The gas monitoring system 10 provided in this embodiment may include: a light source device 200, a gas monitoring device 100, a receiving device 300 and a processing device 400, in which the gas monitoring device 100 may be the gas monitoring device 100 provided by any one of the above embodiments of the present disclosure. FIG. 5 is shown by taking the structure of the gas monitoring device 100 shown in FIG. 4 as an example.

In the above configuration of the embodiment of the present disclosure, the light source device 200 is connected to the light transmission module 110 of the gas monitoring device 100, and is configured to input incident light to the cavity 140 through the light transmission module 110. The cavity 140 in the embodiment of the present disclosure may also be an F-P cavity 140. The optical principle of the F-P cavity 140 and its effect on the incident light in the above embodiments have been described in detail, and thus will not be described herein; the light source device 200 is, for example, a light source, which may be a broadband light source for emitting light having a wavelength ranging from 1300 nm to 1680 nm.

The receiving device 300 is connected to the light transmission module 110 of the gas monitoring device 200, and configured to receive a first light beam and a second light beam emitted by the incident light after passing through the cavity 140, and transmit a received optical signal to the processing device 400; and the receiving device 300 is, for example, a light-sensitive receiver.

The processing device 400 is connected to the receiving device 300, and configured to determine whether the concentration of the gas to be detected is greater than the safety threshold according to the phase difference between the first light beam and the second light beam; and the processing device 400 is, for example, a central processing unit (CPU), which may process the received optical signal.

The gas monitoring system 10 provided by the embodiment of the present disclosure is a complete system for realizing gas concentration detection, which includes a sensor configured to detect a gas concentration, that is, the gas monitoring device 100 provided by any of the above embodiments, and further includes other devices that cooperate with the gas monitoring device 100 to complete the detection. In practical applications, the light outlet of the light source device 200 can be connected to the light inlet of the light transmission module 110, to input incident light to the F-P cavity 140 through the light transmission channel (for example, the fiber core 113) of the light transmission module 110; and the light inlet of the receiving device 300 can be connected to the light outlet of the light transmission module 110, to receive the first light beam a and the second light beam b emitted by the incident light after passing through the F-P cavity 140 and the light transmission channel of the light transmission module 110.

It should be noted that the light inlet and the light outlet of the light transmission module 110 are actually the same end surface of the light transmission module 110, that is, the other end surface 114 opposite to the first end surface 111. The incident light provided by the light source device 200 is incident from the end surface 114 into the light transmission module 110, and the first light beam a and the second light beam b obtained from the incident light being reflected due to the action of the F-P cavity 140 on the light are also emitted from the end surface 114 and then received by the receiving device 300. In addition, the principle of the gas detection in the embodiment of the present disclosure is achieved by the optical path principle of the action of the F-P cavity 140 on the incident light and the combination of the F-P cavity 140 and the gas detecting module 120, which have been described in detail in the above embodiments, and thus will not be described herein.

In the embodiment of the present disclosure, the processing device 400 can continuously acquire the optical signals of the first light beam a and the second light beam b transmitted by the receiving device 300, in which the optical signals of the first light beam a and the second light beam b are, for example, interference wave spectral information. The processing device 400 can process the interference wave spectral information, to convert the optical signal into a digital signal. According to the digital signal obtained by the conversion, it can be determined whether the phases of the first light beam a and the second light beam b drift, and the value $\Delta\phi'$ of the phase drift can be obtained, so that the distance that the second end surface 121 moves toward the first end surface 111 can be reversely reflected by $\Delta\phi'$. It is taken as an example that the safety concentration of the gas to be detected in the air is the critical value in the above embodiment. At this time, the maximum deformation amount of the second end surface 121 is $\Delta A'$, and when the deformation amount of the second end surface 121 exceeds $\Delta A'$, the value $\Delta\phi'$ of the phase shift exceeds the maximum allowable threshold value. That is, the value $\Delta\phi'$ of the phase drift can reversely reflect whether the concentration of the gas to be detected in the air is safe. In practical applications, if the value $\Delta\phi'$ of the phase drift is less than or equal to the maximum critical value, indicating that the gas concentration is less than or equal to the safety threshold, the detection result of the gas monitoring system 10 is safe. If the value $\Delta\phi'$ of the phase drift is greater than the maximum critical value, indicating that the gas concentration is greater than the safety threshold, the detection result of the gas monitoring system 10 is that the harmful gas concentration exceeds the standard, indicating that the air environment is not safe.

The gas monitoring system 10 provided by the embodiment of the present disclosure includes the light source device 200, the gas monitoring device 100 in any of the above embodiments, the receiving device 300 and the processing device 400. The light source device 200 can input the incident light to the cavity 140 through the light transmission module 110. The receiving device 300 can receive the first light beam and the second light beam emitted by the incident light after passing through the cavity 140, and transmit a received optical signal to the processing device 400. The processing device 400 can determine whether the concentration of the gas to be detected is greater than the safety threshold based on the phase difference between the first light beam and the second light beam. The gas monitoring system 10 provided by the present disclosure uses the gas monitoring device 100 provided in the above embodiment as a sensing device for gas concentration detection, and processes the data of the received optical signal by the processing device 400, to determine whether the concentration of the gas to be detected exceeds the safety threshold, thereby accurately and effectively realizing the concentration monitoring of the gas to be detected. In addition, the gas monitoring system 10 has a simple structure, is convenient to use and of low cost, and is very suitable for market-oriented applications.

Figure 6:
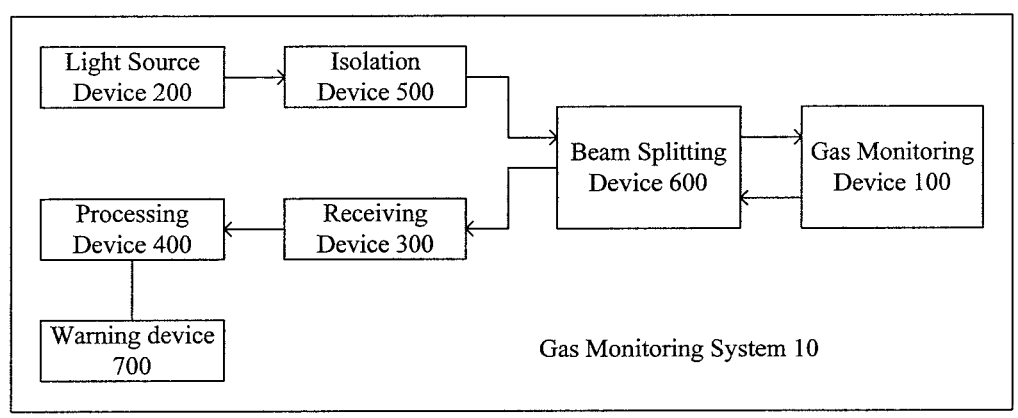
FIG. 6 is a schematic view showing the structure of another gas monitoring system according to an embodiment of the present disclosure.

Optionally, FIG. 6 is a schematic view showing the structure of another gas monitoring system according to an embodiment of the present disclosure. Based on the structure of the gas monitoring system 10 shown in FIG. 5, the gas monitoring system 10 provided by the embodiment of the present disclosure may further include one or more of the following structures: the isolation device 500, the beam splitting device 600, and the warning device 700, in which the isolation device 500 is connected between the light source device 200 and the gas monitoring device 100, the beam splitting device 600 connects the light source device 200 and the receiving device 300 in parallel to the gas monitoring device 100, and the warning device 700 is connected to the processing device 400.

The structure of the gas monitoring system 10 provided by the embodiment of the present disclosure is as shown in FIG. 6. The isolation device 500 is configured to individually propagate incident light emitted from the light source device 200. The isolation device 500 is, for example, an optical fiber isolator, and the optical isolator realizes the individually propagation of optical signals.

The beam splitting device 600 is configured to perform a beam splitting treatment to the incident light input by the light source device 200 to the gas monitoring device 100 and the light emitted after passing through the gas monitoring device 100; and the beam splitting device 600 is, for example, a beam splitter. The incident light emitted by the light source device 200 passes through the beam splitting device 600 and then reaches the gas monitoring device 100. The first light beam a and the second light beam b obtained by the incident light which enters the gas monitoring device 100 and undergoes the action of the cavity 140 on the light and then emitted also pass through the beam splitting device 600 and then are received by the receiving device 300, to avoid interference between the incident light and the emergent light.

The warning device 700 is configured to send out an alarm signal when the processing device 400 determines that the concentration of the gas to be detected is greater than the safety threshold; and the warning device 700 is, for example, an alertor. When an alarm signal is received, the alertor will send out an alarm indication message, such as illuminate an alarm light and sound a whistle, according to the indication of the signal. The alertor may also send out other types of alarm information. For example, the warning device 700 may be connected to the user's mobile terminal through a network, to remotely transmit alarm information.

It should be noted that FIG. 6 takes the gas monitoring system 10 including the above-mentioned isolation device 500, the beam splitting device 600 and the warning device 700 as an example. FIG. 6 does not illustrate the specific structure of the gas monitoring device 100, but the connection relationship with other devices. The gas monitoring device 100 may be any one of the gas monitoring devices 100 shown in FIGS. 1 to 4. In practical applications, if it is required to monitor the gas concentration at a plurality of locations, a plurality of gas monitoring devices 100 may be arranged at the monitoring locations, and each of the plurality of gas monitoring devices 100 may have an independent receiving device 300. In addition, the gas monitoring devices 100 may also share the light source device 100, the processing device 400, the beam splitting device 600, and the warning device 700.

The gas monitoring system 10 in the present embodiment integrates the gas monitoring device 100 with the light source device 200 for providing the incident light, the receiving device 300 for receiving the optical signal, the processing device 400 for performing the data processing and the warning device 700 into an integrated equipment.

The equipment is easy to monitor the gas concentration at any time and send out alarms at any time, and is very suitable for current market applications.

Figure 7:
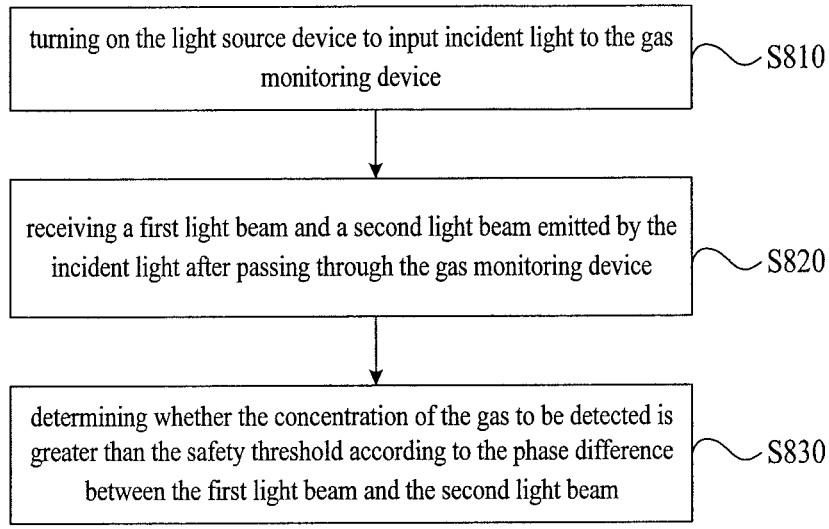
FIG. 7 is a flowchart showing a gas monitoring method according to an embodiment of the present disclosure.

Based on the gas monitoring system 10 provided by the above embodiment of the present disclosure, the embodiment of the present disclosure further provides a gas monitoring method performed by the gas monitoring system 10 provided by any of the above embodiments of the present disclosure. FIG. 7 is a flowchart of a gas monitoring method provided by an embodiment of the present disclosure, which includes the following steps: S810, turning on the light source device to input incident light to the gas monitoring device; S820, receiving a first light beam and a second light beam emitted by the incident light after passing through the gas monitoring device; and S830, determining whether the concentration of the gas to be detected is greater than the safety threshold according to the phase difference between the first light beam and the second light beam.

The gas monitoring method provided by the embodiment of the present disclosure is performed by the gas monitoring system 10 according to any one of the above embodiments shown in FIG. 5 or FIG. 6. The specific structure of the gas monitoring system 10 and the gas monitoring device 100 therein, and the function achieved by each of the devices therein have been described in detail in the above embodiments, and thus will not be described herein. The principle of monitoring the gas concentration by using the gas monitoring system 10 in the embodiment of the present disclosure is shown as follows. The incident light is provided by the turned-on light source device, and the incident light is input into the cavity of the gas monitoring device through the light transmission module. The incident light passes through the cavity and becomes the first light beam and the second light beam that interfere with each other. By continuously acquiring the first light beam and the second light beam and processing the interference wave spectrum, it can be known whether the phase of the interference wave spectrum drifts, and the value $\Delta\phi'$ of the phase drift can be obtained. Thus, the distance by which the second end surface 121 moves toward the first end surface 111 can be reversely reflected by $\Delta\phi'$. It is taken as an example that the safety concentration of the gas to be detected in the air is the critical value in the above embodiment. At this time, the maximum deformation amount of the second end surface 121 is $\Delta A'$, and when the deformation amount of the second end surface 121 exceeds $\Delta A'$, the value $\Delta\phi'$ of the phase shift exceeds the maximum allowable threshold value. That is, the value $\Delta\phi'$ of the phase drift can reversely reflect whether the concentration of the gas to be detected in the air is safe. In practical applications, if the value $\Delta\phi'$ of the phase drift is less than or equal to the maximum critical value, indicating that the gas concentration is less than or equal to the safety threshold, the detection result of the gas monitoring system is safe. If the value $\Delta\phi'$ of the phase drift is greater than the maximum critical value, indicating that the gas concentration is greater than the safety threshold, the detection result of the gas monitoring system is that the harmful gas concentration exceeds the standard, indicating that the air environment is not safe.

It should be noted that, in the embodiment of the present disclosure the action principle of the cavity (for example, an F-P cavity) on the incident light and the principle that the incident light is emitted as the first light beam and the second light beam having the same emergence angle and a fixed phase difference has been described in detail in the above embodiments, and thus will not be described herein.

The gas monitoring method provided by the embodiment of the present disclosure performs the gas monitoring by using the gas monitoring system 10 according to any one of the embodiments shown in FIG. 5 or FIG. 6. The incident light is input to the gas monitoring device by the turned-on light source device, the first light beam and the second light beam emitted by the incident light after passing through the gas monitoring device are received, and it is determined whether the concentration of the gas to be detected exceeds a safety threshold according to a phase difference between the first light beam and the second light beam. The gas monitoring method provided by the present disclosure uses the gas monitoring device provided in the above embodiment as a sensing device for gas concentration detection, and processes the data of the received optical signal (i.e., the first light beam and the second light beam that interfere with each other), to determine whether the concentration of the gas to be detected exceeds the safety threshold, thereby accurately and effectively realizing the concentration monitoring of the gas to be detected. In addition, the gas monitoring system for performing the method has a simple structure, is convenient to use and of low cost, and is very suitable for market-oriented applications.

Figure 8:
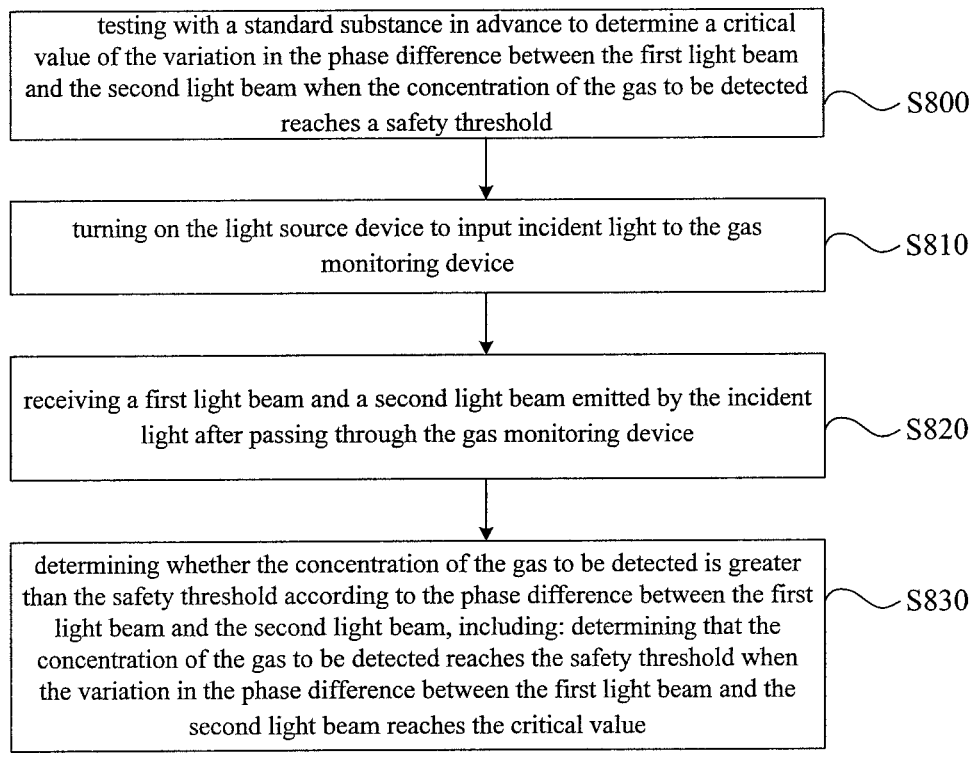
FIG. 8 is a flowchart showing another gas monitoring method according to an embodiment of the present disclosure.

Optionally, FIG. 8 is a flowchart showing another gas monitoring method according to an embodiment of the present disclosure. On the basis of the flow shown in FIG. 7, the gas monitoring method provided by the embodiment of the present disclosure may further include:

S800: testing with a standard substance in advance to determine a critical value of the variation in the phase difference between the first light beam and the second light beam when the concentration of the gas to be detected reaches a safety threshold; in which the S830 includes: determining that the concentration of the gas to be detected reaches the safety threshold when the variation in the phase difference between the first light beam and the second light beam reaches the critical value.

Figure 9:
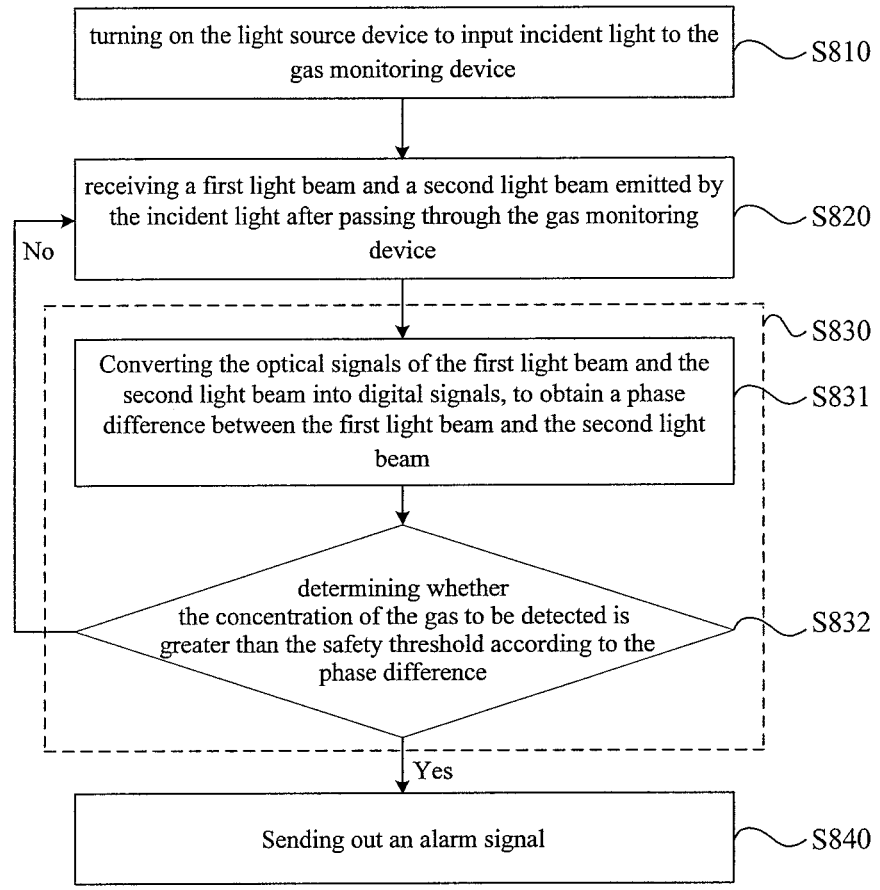
FIG. 9 is a flowchart showing yet another gas monitoring method according to an embodiment of the present disclosure.

Optionally, FIG. 9 is a flowchart showing yet another gas monitoring method according to an embodiment of the present disclosure. On the basis of the flow shown in FIG. 7, in the gas monitoring method provided by the embodiment of the present disclosure, the S830 may include:

S831, converting the optical signals of the first light beam and the second light beam into digital signals, to obtain a phase difference between the first light beam and the second light beam;

S832, determining whether the concentration of the gas to be detected is greater than the safety threshold according to the phase difference; executing S840 if the concentration is greater than the safety threshold; or returning to continue to execute S820 if the concentration is less than or equal to the safety threshold; and S840, sending out an alarm signal.

In the embodiment of the present disclosure, the form of the alarm signal may include alarm indication information such as illuminating an alarm light, sounding a whistle, and the like. It may also send out other types of alarm information, for example, the gas monitoring system may be connected to the user's mobile terminal through a network, to remotely transmit alarm information.

Figure 10:
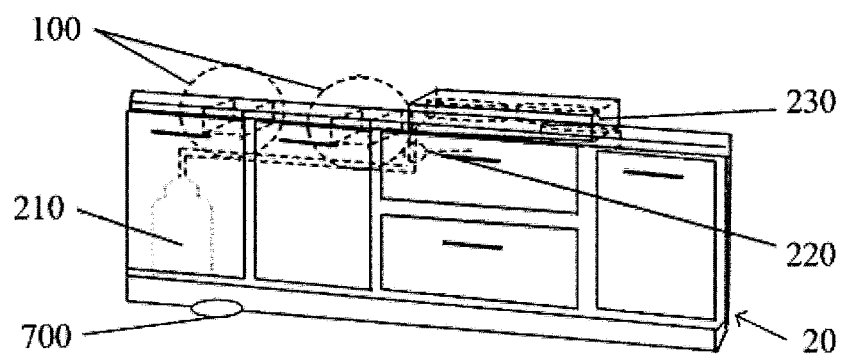
FIG. 10 is a schematic view showing the structure of a cabinet according to an embodiment of the present disclosure.

According to the gas monitoring system 10 provided by the above embodiment of the present disclosure, an embodiment of the present disclosure further provides a cabinet as shown in FIG. 10, which is a schematic view showing the structure of a cabinet provided by the embodiments of the present disclosure. The cabinet 20 is provided with the gas monitoring system 10 according to any one of the embodiments shown in FIG. 5 or 6. It should be noted that, FIG. 10 only schematically illustrates the installation positions of the gas monitoring device 100 and the warning device 700 in the gas monitoring system 10. The gas monitoring device 100 may be arranged in an area where gas leakage is likely to occur, the warning device 700 may be arranged in a conspicuous area where it is convenient for the user to find the alarm, and the positions of other devices of the gas monitoring system 10 can be flexibly arranged according to the structure and size of the cabinet.

Optionally, in the embodiment of the present disclosure, the position of the gas monitoring device 100 in the gas monitoring system 10 in the cabinet includes one or more of the following positions: a gas tank area, a gas switch area, and a gas pipeline access area.

As shown in FIG. 10, which schematically illustrates a cabinet installed in a user's house, the cabinet further includes a cabinet body 20, a gas tank 210, a gas switch 220, and a gas cooker 230. The cabinet body 20 in the embodiment of the present disclosure is not limited to the structure and form shown in FIG. 10. In a possible implementation manner of the embodiment of the present disclosure, the cabinet may also adopt a gas supply mode using a gas tank 210 (as shown in FIG. 10). In the application scenario, the gas tank 210 area and the gas switch 220 area are high-incidence areas of gas leakage, and the sensor (i.e., the gas monitoring device 100) of the gas monitoring system 10 may be arranged in these areas. In another possible implementation manner of the embodiment of the present disclosure, the cabinet may also adopt a gas supply mode of natural gas. In this application scenario, the gas pipeline access area and the gas switch area are high-incidence areas of gas leakage, and the sensor (i.e., the gas monitoring device 100) of the gas monitoring system 10 may be arranged in these areas.

It should be noted that if gas monitoring is required for a plurality of areas in the cabinet, a gas monitoring device 100 may be arranged in each area of the monitoring. Each of these gas monitoring device 100 may have an independent receiving device 300, and in addition, these gas monitoring device 100 can share the light source device 100, the processing device 400, the beam splitting device 600, and the warning device 700. That is to say, the light source device 100 can provide light sources to the plurality of gas monitoring devices 100 arranged at different positions. After the incident light enters the different gas monitoring devices 100, the corresponding receiving devices 300 receive the optical signals which interfere with each other, the optical signal emitted by the different gas monitoring devices 100 can be processed by one processing device 400. The processing device 400 can acquire information that which region of the gas monitoring device 100 detects the gas concentration exceeding the safety threshold according to the source of the optical signal, and send out an alarm signal by the warning device 700. The alertor of the warning device 700 can be arranged corresponding to the gas monitoring device 100 described above, and clearly indicates which gas monitoring device 100 is the source of the alarm signal.

The embodiment of the present disclosure further provides a computer readable storage medium, which stores executable instructions, and when the executable instructions are executed by the processor, the gas monitoring method provided by any of the above embodiments of the present disclosure may be implemented. The gas monitoring method can be used to monitor the concentration of the gas to be detected in the air in real time, thereby determining the safety of the air environment. The embodiment of the computer readable storage medium provided by the embodiment of the present disclosure is substantially the same as the gas monitoring method provided by the foregoing embodiment of the present disclosure, and thus is not described herein.

The embodiments disclosed in the present disclosure are as described above, but they are merely used to facilitate the understanding of the embodiments of the present disclosure, and are not intended to limit the present disclosure. Any modification and variation in the form and details of the embodiments may be made by a person skilled in the art without departing from the spirit and scope of the present disclosure. The scope of patent protection is still subject to the scope defined by the appended claims.

What is claimed is:

1. A gas monitoring device, comprising a tubular housing, a light transmission module arranged at one end of the tubular housing, and a gas detecting module arranged at the other end of the tubular housing, wherein a first end surface of the light transmission module proximate to the gas detecting module, a second end surface of the gas detecting module proximate to the first end surface, and the tubular housing form a cavity, and the first end surface and the second end surface are parallel to each other;

the light transmission module is configured to input incident light to the cavity through the first end surface;

the gas detecting module is configured to adjust a distance between the second end surface and the first end surface according to a concentration of a gas to be detected; and wherein the gas detecting module comprises a gas-sensitive film layer arranged on one side of the tubular housing away from the light transmission module and a reflective film arranged to be attached in the tubular housing for forming the second end surface, and the gas-sensitive film layer, the reflective film and the tubular housing form a hollow structure, the hollow structure is with a compressed gas;

the gas-sensitive film layer is configured to adsorb the gas to be detected; and the reflective film is configured to move the second end surface toward the first end surface according to a mass of the gas adsorbed by the gas-sensitive film layer.

2. The gas monitoring device of claim 1, wherein the light transmission module comprises a sensing optical fiber arranged to be attached on an inner wall of the tubular housing, and the sensing optical fiber comprises a fiber core and an optical fiber tube for wrapping the fiber core; and the sensing optical fiber is configured to input incident light entering the fiber core into the cavity.

3. The gas monitoring device of claim 1, wherein a material of the gas-sensitive film layer comprises one or more of a composite polymer gas-sensitive material and a conjugated polymer gas-sensitive material.

4. The gas monitoring device of claim 3, wherein the composite polymer gas-sensitive material comprises one or more of polyimide, polyethylene, polytetrafluoroethylene, and polyester; and metal particles, tetrathiafulvalene 7,7,8,8-tetracyanoquinodimethane salt or carbon nanotube is used as a conductive filler.

5. The gas monitoring device of claim 3, wherein the conjugated polymer gas-sensitive material comprises one or more of poly(bistributyl-phosphine)-platinum-diethynylbiphenyl, poly-2,5-dibutoxyethynylbenzene and poly-2,5-dioctyloxyethynylbenzene.

6. The gas monitoring device of claim 1, wherein a material of the reflective film comprises titanium oxide or silicon oxide.

7. The gas monitoring device of claim 1, wherein
the gas detecting module is further configured to move the second end surface toward a position proximate to the first end surface when it is detected that the concentration of the gas to be detected increases, and further configured to move the second end surface toward a position away from the first end surface when it is detected that the concentration of the detection gas to be detected decreases.

8. The gas monitoring device of claim 7, wherein the sensitivity of the gas monitoring device is in direct proportion to a wavelength of incident light reaching the first end surface.

9. A gas monitoring system, comprising a light source device, the gas monitoring device of claim 1, a receiving device and a processing device,
wherein the light source device is connected to the light transmission module of the gas monitoring device, and configured to input incident light to the cavity through the light transmission module;
the receiving device is connected to the light transmission module of the gas monitoring device, and configured to receive a first light beam and a second light beam emitted by the incident light after passing through the cavity, and transmit a received optical signal to the processing device; and
the processing device is connected to the receiving device, and configured to determine whether the concentration of the gas to be detected is greater than a safety threshold according to a phase difference between the first light beam and the second light beam.

10. The gas monitoring system of claim 9, wherein the gas detecting module in the gas monitoring device comprises a gas-sensitive film layer arranged on one side of the tubular housing away from the light transmission module and a reflective film arranged to be attached in the tubular housing for forming the second end surface, and the gas-sensitive film layer, the reflective film and the tubular housing form a hollow structure, the hollow structure is filled with a compressed gas;
the gas-sensitive film layer is configured to adsorb the gas to be detected; and
the reflective film is configured to move the second end surface toward the first end surface according to a mass of a gas adsorbed by the gas-sensitive film layer.

11. The gas monitoring system of claim 9, further comprising:
an isolation device connected between the light source device and the gas monitoring device and configured to individually propagate incident light emitted from the light source device to the gas monitoring device.

12. The gas monitoring system of claim 9, further comprising:
a beam splitting device connecting the light source device and the receiving device in parallel to the gas monitoring device, and configured to perform a beam splitting treatment to the incident light input by the light source device to the gas monitoring device and the light emitted after passing through the gas monitoring device.

13. The gas monitoring system of claim 9, further comprising:
a warning device connected to the processing device, and configured to send out an alarm signal when the processing device determines that the concentration of the gas to be detected is greater than the safety threshold.

14. The gas monitoring system of claim 9, wherein the incident light input by the light source device through the light transmission module to the cavity has a wavelength ranging from 1300 nm to 1680 nm.

15. A gas monitoring method, performed by the gas monitoring system of claim 9, the method comprising:
turning on the light source device to input incident light to the gas monitoring device;
receiving the first light beam and the second light beam emitted by the incident light after passing through the gas monitoring device; and
determining whether the concentration of the gas to be detected is greater than the safety threshold according to the phase difference between the first light beam and the second light beam.

16. The gas monitoring method of claim 15, further comprising:
testing with a standard substance in advance to determine a critical value of a variation in the phase difference between the first light beam and the second light beam when the concentration of the gas to be detected reaches the safety threshold;
wherein determining whether the concentration of the gas to be detected is greater than the safety threshold according to the phase difference between the first light beam and the second light beam comprises: determining that the concentration of the gas to be detected reaches the safety threshold when the variation in the phase difference between the first light beam and the second light beam reaches the critical value.

17. The gas monitoring method of claim 15, further comprising:
sending out an alarm signal when it is determined that the concentration of the gas to be detected is greater than the safety threshold.

18. A cabinet provided with the gas monitoring system of claim 9.

19. A computer readable storage medium, storing executable instructions capable of implementing the gas monitoring method of claim 15 when executed by a processor.

20. The gas monitoring device of claim 1, wherein an area of the first end surface is same as an area of the second end surface.

* * * * *